US012807309B2

(12) United States Patent
Salesse-Lavergne et al.

(10) Patent No.: US 12,807,309 B2
(45) Date of Patent: Nov. 24, 2026

(54) ROTORCRAFT WITH A FLIGHT CONTROL SYSTEM FOR IMPROVING ROTORCRAFT CONTROL UPON OCCURRENCE OF AN IN-FLIGHT SHUTDOWN IN AN ASYMMETRIC FLIGHT REGIME MODE

(71) Applicants: AIRBUS HELICOPTERS, Marignane (FR); AIRBUS HELICOPTERS DEUTSCHLAND GMBH, Donauwörth (DE)

(72) Inventors: Marc Salesse-Lavergne, Allauch (FR); Hyun-Min Kim-Lee, Augsburg (DE)

(73) Assignees: AIRBUS HELICOPTERS, Marignane (FR); AIRBUS HELICOPTERS DEUTSCHLAND GmbH, Donauwörth (DE)

( * ) Notice: Subject to any disclaimer, the term of this patent is extended or adjusted under 35 U.S.C. 154(b) by 0 days.

(21) Appl. No.: 19/241,549

(22) Filed: Jun. 18, 2025

(65) Prior Publication Data

US 2026/0167328 A1 Jun. 18, 2026

(30) Foreign Application Priority Data

Dec. 13, 2024 (EP) .................................... 24315577

(51) Int. Cl.
*B64C 27/57* (2006.01)
*B64C 27/58* (2006.01)

(52) U.S. Cl.
CPC .............. *B64C 27/57* (2013.01); *B64C 27/58* (2013.01)

(58) Field of Classification Search
CPC ................................ B64C 27/57; B64C 27/58
See application file for complete search history.

(56) References Cited

U.S. PATENT DOCUMENTS 7,223,071 B2 5/2007 Certain
9,821,908 B2 11/2017 Schaeffer et al.
9,963,225 B2 5/2018 Vallart et al.
(Continued)

FOREIGN PATENT DOCUMENTS

EP 2801522 B1 9/2015

OTHER PUBLICATIONS

European Search Report for European Application No. EP 24315577.7, Completed by the European Patent Office, Dated Mar. 31, 2025. 10 pages.

*Primary Examiner* — Kenneth M Dunne
(74) *Attorney, Agent, or Firm* — Brooks Kushman P.C.

(57) ABSTRACT

A rotorcraft having a main rotor with at least one main rotor actuator; a series actuator arranged upstream of the main rotor actuator; engines for powering the main rotor; and a flight control system for controlling flight operation in an AEO mode or in an AFR mode, comprising: a control logic for pre-conditioning the series actuator upon entering the AFR mode for enabling rotorcraft control upon occurrence of an IFSD, wherein pre-conditioning of the series actuator comprises shifting a reduced nominal stroke range authorized for the series actuator stroke of the series actuator in the AEO mode into a reduced shifted stroke range authorized for the series actuator stroke of the series actuator in the AFR mode to enable authorization of an increased stroke range upon occurrence of an IFSD to provide sufficient control authority for a recovery maneuver.

20 Claims, 3 Drawing Sheets

(56) References Cited

U.S. PATENT DOCUMENTS

| | | | | |
|---|---|---|---|---|
| 11,194,349 | B2 | 12/2021 | White et al. | |
| 11,299,286 | B2 | 4/2022 | Beauchesne-Martel et al. | |
| 2007/0164167 | A1 | 7/2007 | Bachelder et al. | |
| 2016/0023757 | A1 | 1/2016 | Robert, II et al. | |
| 2017/0088281 | A1* | 3/2017 | Vallart | B64C 27/12 |
| 2020/0361620 | A1* | 11/2020 | Beauchesne-Martel | B64C 27/57 |
| 2024/0083570 | A1 | 3/2024 | Ramamurthy | |

* cited by examiner

ROTORCRAFT WITH A FLIGHT CONTROL SYSTEM FOR IMPROVING ROTORCRAFT CONTROL UPON OCCURRENCE OF AN IN-FLIGHT SHUTDOWN IN AN ASYMMETRIC FLIGHT REGIME MODE

CROSS-REFERENCE TO RELATED APPLICATION

This application claims priority to European patent application No. EP 24315577.7 filed on Dec. 13, 2024, the disclosure of which is incorporated in its entirety by reference herein.

TECHNICAL FIELD

The disclosure is related to a rotorcraft that comprises at least one main rotor with at least one main rotor actuator for adapting main rotor control dependent on a current flight condition of the rotorcraft; at least one first engine and at least one second engine for powering the at least one main rotor; and a flight control system for controlling flight operation of the rotorcraft at least in an All Engines Operative mode, in which the at least one first engine and the at least one second engine are powering the at least one main rotor, or in an asymmetric flight regime mode, in which only the at least one first engine is powering the at least one main rotor. The disclosure is further related to a flight control system and a method for controlling flight operation of such a rotorcraft.

BACKGROUND

More generally, a multi-engine rotorcraft, e.g., a twin-engine helicopter, that comprises at least one main rotor and at least two engines for powering the at least one main rotor may be operated in an All Engines Operative (AEO) mode, wherein each of the at least two engines is supplying non-zero mechanical power to the at least one main rotor so that the at least two engines are supplying a required mechanical power to the at least one main rotor together, e.g., in a substantially symmetrical manner. The at least two engines may be embodied as thermal engines and are typically designed to be over-dimensioned to allow the at least one main rotor to be driven with a single engine in the event of another engine failing. Furthermore, in order to reduce the fuel consumption of the thermal engines, the multi-engine rotorcraft may be operated in a so-called Super Idle Operation (SIO) mode which is mainly intended to enable in cruise flight during a given flight mission a reduction in fuel consumption of the rotorcraft, as well as a reduction of polluting emissions and a contribution to decarbonization, and/or an increase of the rotorcraft's flight endurance or range. To this end, a selected one of the at least two engines is set to a passive operating state in the SIO mode by lowering down to desynchronization, i.e., zero power, the selected one of the at least two engines such that the other one of the at least two engines is required to handle the flight mission alone with an increased power request. In the SIO mode, the passive engine is operative, but it may possibly be idling, or operating at a speed of rotation slower than idle speed, i.e., super idle.

Alternatively, the multi-engine rotorcraft may be operated in a Single Engine Operation (SEO) mode wherein the selected one of the at least two engines may be set to an inactive state by being shut down such that the other one of the at least two engines is required to handle the flight mission alone with an increased power request. In fact, even when operating in a comparatively high loaded power regime with the increased power request, the other one of the at least two engines will generally consume less fuel than required by the selected one and the other one of the at least two engines together in a comparatively low loaded power regime with reduced power request. Thus, the SEO mode and SIO mode are economy operating modes which are also known as asymmetric flight regime (AFR) modes for involving asymmetrical operation of the heat engines, as the at least two engines do not operate in an identical manner.

During an AFR mode, the multi-engine rotorcraft may face an in-flight shutdown (IFSD) condition of the current active engine that is powering the at least one main rotor, which may end in an autorotation condition. In terms of autorotation automation, the documents U.S. Ser. No. 11,194,349 B2 and U.S. 2007/164167 A1 describe methods of entering main rotors of respective rotorcrafts into autorotation upon detection of engine failures for permitting the safe landing and recovery of the rotorcrafts following engine failures.

However, due to the time sensitive nature of the autorotation such an engine failure scenario would require immediate actions on the flight controls e.g., to avoid rapid and catastrophic main rotor rotation speed (i.e., RPM) drop. For instance, the document U.S. 2024/0083570 A1 describes a rotorcraft including a first engine, a second engine, a primary engine-start system for the first engine, a fast-start engine-start system for the first engine, and a computer system. The computer system is configured to detect a failure of the second engine during a reduced engine operation (REO) flight mode in which the first engine has been intentionally shut down inflight and the second engine is to remain operational, and to automatically initiate, in response to detecting the failure of the second engine during the REO flight mode, an automatic restart of the first engine using the fast-start engine-start system.

Furthermore, the document U.S. Ser. No. 11,299,286 B2 describes a method for operating a rotorcraft comprising a plurality of engines which are configured to provide motive power to the rotorcraft, and at least one rotor coupled to the plurality of engines. The rotorcraft may be operated in an Asymmetric Operating Regime (AOR), in which at least one first engine of the plurality of engines is a currently operating engine that is operated in an active mode to provide motive power to the rotorcraft, while at least one second engine of the plurality of engines is inactive and, thus, operated in a standby mode to provide substantially no motive power to the rotorcraft. If a failure of the currently operating engine is detected, one or more flight control inputs of the at least one rotor is/are adjusted to compensate for a reduction in the rotor speed, which results from the failure of the currently operating engine. The flight control input(s) is/are adjusted to increase the rotor speed so that the at least one rotor rotates at substantially the same rotor speed as before the failure of the currently operating engine. Furthermore, an increase in power output of the inactive engine is commanded. Moreover, further adjustments to the flight control input(s) are made. For instance, the flight control input(s) may be reverted back to respective pre-engine-failure values.

However, if such failure conditions of the currently operating engine occur during the AFR mode and if the respective suitable actions are not performed fast enough, reactivating of the currently slowed-down or switched-off engine in the AFR mode during a flight mission may require more time than the at least one main rotor of a given rotorcraft could afford before ending up in a critical and non-recoverable low rotor speed state. The situation becomes even more severe if an autopilot of the given rotorcraft is engaged and/or the rotor inertia is low and the pilot is e.g., less attentive. For instance, if the autopilot of the given rotorcraft is engaged, certification demands at least three seconds hands-off before any pilot action occurs, which might conceivably end in a non-recoverable flight situation after detection of the above-described failure conditions of the currently operating engine.

SUMMARY

Therefore, it is an object of the present disclosure to provide a new rotorcraft comprising a flight control system for at least controlling flight operation of the rotorcraft upon occurrence of an IFSD in an AFR mode, wherein the flight control system is suitable to enable the safe recovery of the rotorcraft from an in-flight engine failure of the nominal engine during an AFR mode until the so far inactive engine's full recovery. Another object of the present disclosure is to provide a flight control system and a method for controlling flight operation of such a rotorcraft.

The above-described object is solved by a rotorcraft. More specifically, according to the present disclosure the rotorcraft comprises at least one main rotor with at least one main rotor actuator for adapting main rotor control dependent on a current flight condition of the rotorcraft, at least one first engine and at least one second engine for powering the at least one main rotor; and a flight control system for controlling flight operation of the rotorcraft, wherein main rotor actuator stroke of the at least one main rotor actuator is adjusted via series actuator stroke of at least one series actuator arranged upstream of the at least one main rotor actuator, wherein the at least one series actuator is coupled to a control lever that is connected to at least one parallel actuator, and wherein the flight control system is configured for controlling flight operation of the rotorcraft at least in an All Engines Operative (AEO) mode, in which the at least one first engine and the at least one second engine are powering the at least one main rotor, or in an asymmetric flight regime (AFR) mode, in which only the at least one first engine is powering the at least one main rotor. The flight control system comprises a control logic configured for pre-conditioning the at least one series actuator upon entering the AFR mode for enabling rotorcraft control upon occurrence of an in-flight shutdown (IFSD) of the at least one first engine in the AFR mode, wherein pre-conditioning of the at least one series actuator comprises shifting a reduced nominal stroke range authorized for the series actuator stroke of the at least one series actuator in the AEO mode into a reduced shifted stroke range authorized for the series actuator stroke of the at least one series actuator in the AFR mode to enable authorization of an increased stroke range upon occurrence of an IFSD, the increased stroke range being adapted to provide sufficient control authority required for a recovery maneuver in response to occurrence of an IFSD.

Preferably, the at least one main rotor actuator is usable for a collective axis actuation, and/or a pitch/longitudinal axis actuation of the at least one main rotor. In particular, a collective axis command for collective axis actuation may result from the sum of a given control level, e.g., as applied by a collective stick lever, plus the actuation of a series actuator, and the collective stick lever can either be commanded by a parallel actuator or by a pilot of the rotorcraft.

In particular, according to the present disclosure each engine operating state of the rotorcraft may be associated to a series actuation stroke range with possible asymmetric limits. For instance, the flight control system (FCS) may be potentially confronted to the following engines' states:

a) an AEO state, b) an AFR state, e.g., resulting from SEO or SIO, c) an IFSD state in AFR, e.g., during SEO/SIO a so far active power providing engine, e.g., the first engine of the at least two engines, is unexpectedly shutdown due to an engine failure while the so far deliberately slowed or shut-down engine, e.g., the second engine of the at least two engines, is restarted and, yet, not able to immediately provide sufficient power to the main rotor, d) a One Engine Inoperative (OEI) state, e.g., only the second engine of the at least two engines is powering the at least one main rotor while the first engine of the at least two engines is inoperative due to an engine failure, e) a Two Engines Inoperative (TEI) state, e.g., after IFSD in AFR, the second engine of the at least two engines failed to successfully restart and power the main rotor or also unexpectedly shuts down at a later point during OEI flight operation, resulting in the rotorcraft facing a scenario of complete engine loss.

As such, designated series actuation stroke ranges may be defined for each of the above engines' states. If desired, designated series actuation stroke ranges may also be defined for any transition between those states.

Furthermore, depending on the engines' states, suitable FCS objectives may be computed and defined for flight control and appropriate flight control strategy may then be selected with corresponding FCS objectives. By way of example, for engines' state c) above, the FCS objectives may be managed depending on initial flight conditions and optimal pitch and collective axis commands to maintain sufficient main rotor rotational speed (i.e., RPM) and minimize altitude loss after the failure of one active engine until a second engine is restarted to recover full power. Furthermore, the roll axis and yaw axis may be controlled as well to minimize the response caused by the power loss and the recovery maneuver.

Advantageously, the specific pre-conditioning of the actuators during the AFR mode enables the actuators to act with a sufficient available control authority, e.g., maximally available stroke range, for the recovery maneuver from a power loss of the rotorcraft.

Preferably, the pre-conditioning of the at least one series actuator is performed in an automated process. As such, the increased stroke will be available as soon as the AFR mode is activated and an automatic response could be realized with parallel and/or series FCS actuators using the increased stroke of the serial actuators when the active engine loss is detected. As such, optimizing the flight envelope of the rotorcraft can be achieved by automatically controlling the trajectory and the response to the active engine loss in AFR mode until a full recovery of the so far inactive engine is realized. In addition, such automatic response addressing the practical ways of commanding the desired maneuver may also be executed by conventional parallel and series actuators, such that the overall costs and risks of such solution are reduced.

Furthermore, by automatically controlling the trajectory using an increased stroke, altitude loss in flight operation may be minimized when respective height margins are low or a collision with an aircraft flying in a lower flight corridor, i.e., 200 m below the rotorcraft, could be avoided. More specifically, with increased strokes of respective automated FCS (AFCS) actuators, an automated in-flight optimization of the combination of the flight and main rotor speed through adjusting respective controls, i.e., collective pitch, cyclic, pedals and other aerodynamic surfaces, in stabilized autorotation descent advantageously minimizes height loss during the engine in-flight reactivating. By way of example, such control adjustments may comprise reducing a current flight speed of the rotorcraft automatically to a best rate of climb speed Vy where a respective power request during the autorotation and during subsequent recovery of the initial flight state after engine in-flight re-activating may be reduced.

By way of example, in engines' state c) above, a minimum main rotor RPM constraint may be applied e.g., by not letting the main rotor RPM drop below 90%, 85% or 80%. Furthermore, such objectives of the engines' state c) above may progressively transform into those of engines' state d) above as power is re-gained from the restarted engine. Engines' state d) above is the nominal, natural soft end of engines' state c) above.

Differing from the conventional autorotation where a higher main rotor RPM and, hence, descend rate may be preferable, the above described autopilot function implements a new initial deceleration strategy, namely a reduction of the main rotor speed, i.e., a reduction to the best rate of climb speed Vy, in order to reduce the descent rate. Such a strategy is particularly applicable when the helicopter is flying sufficiently above the best rate of climb speed Vy at the moment of the active engine loss.

According to some aspects, pre-conditioning of the at least one series actuator upon entering the AFR mode may comprise increasing the reduced shifted stroke range for the series actuator stroke to the maximally available stroke range to provide fully available control authority upon occurrence of an IFSD.

According to some aspects, pre-conditioning of the at least one series actuator upon entering the AFR mode may comprise shifting of a neutral stroke position of the at least one series actuator to a maximally shifted neutral stroke position to provide fully available control authority upon occurrence of an IFSD, and adjusting the at least one parallel actuator for compensating shifting of the neutral stroke position of the at least one series actuator.

According to some aspects, the control logic may be configured for setting a neutral stroke position for the series actuator stroke of the at least one series actuator in the maximally available stroke range, wherein the neutral stroke position is a centered stroke position in the AEO mode that evenly divides the maximally available stroke range into two maximally available stroke regions for stroke in two opposite stroke directions, and wherein the reduced nominal stroke range comprises two reduced authorized stroke regions which are smaller than the two maximally available stroke regions.

If desired, each engines' state may be associated to three series actuation configuration parameters, namely, a minimum (min) stroke range, a maximum (max) stroke range and a "neutral stroke". By way of example, in AEO mode, an AEO specific set of series actuation configuration parameters (i.e., min stroke range, max stroke range, and "neutral stroke") is chosen which includes choosing opposite min stroke range and max stroke range and choosing the "neutral stroke" to be in the middle of the min and max stroke ranges.

According to some aspects, pre-conditioning of the at least one series actuator upon entering the AFR mode may comprise limiting the maximally available stroke range to the reduced shifted stroke range in the AFR mode until occurrence of an IFSD of the at least one first engine in the AFR mode, wherein the reduced shifted stroke range is smaller than the maximally available stroke range and, preferably, equal to the reduced nominal stroke range.

According to some aspects, pre-conditioning of the at least one series actuator upon entering the AFR mode may comprise shifting the neutral stroke position for the series actuator stroke of the at least one series actuator from the centered stroke position in the AEO mode to a shifted stroke position in the AFR mode, the shifted stroke position being adapted to enable an increase of control authority for main rotor control to enable a required recovery maneuver in response to occurrence of an IFSD.

According to some aspects, the reduced shifted stroke range may be evenly divided, by the shifted neutral stroke position for the series actuator stroke of the at least one series actuator, into two shifted stroke regions.

According to some aspects, the control logic is configured for pre-conditioning the at least one parallel actuator upon entering the AFR mode for enabling rotorcraft control upon occurrence of an IFSD of the at least one first engine in the AFR mode by adapting a current parallel actuator position of the at least one parallel actuator for compensating the shifting of the neutral stroke position for the series actuator stroke of the at least one series actuator.

More specifically, as axes command result from the sum of stick/pedals and series actuation, every series actuation offset needs to be compensated by opposite travel of the stick/pedals, as commanded by their respective parallel actuators, to keep the above-mentioned sum unaffected by the series actuation offset introduction. As such, every time the "neutral stroke" position changes, the parallel actuator command must adapt to this change.

According to some aspects, adapting the current parallel actuator position of the at least one parallel actuator for compensating the shifting may comprise moving, by means of the at least one parallel actuator, a neutral control position of the control lever from a nominal neutral control position in the AEO mode to a shifted neutral control position in the AFR mode which differs from the nominal neutral control position, the shifted neutral control position being adapted to allow the series actuator stroke of the at least one series actuator with increased authority.

According to some aspects, the control logic may be configured for adapting the force-feel feedback to a pilot of the rotorcraft, via associated force-feel characteristics of the parallel actuator.

More specifically, in general two different parties act on the same control of a parallel actuation, namely the pilot and the actuator. As such, for a certain control, the parallel actuator must act on this control via a force transmission solution that remains compatible with the pilot action potentially taking place at any time. Consequently, the pilot necessarily feels some opposing force upon every manual/pedals action.

Likewise, there are usually two key subjects in parallel actuation, namely the stick/pedals position "hands/feet-off" command and the haptic feedback to the pilot. When commanding the stick/pedals over a large travel upon IFSD, the pilot may interfere on those controls, most likely to either speed-up or slow-down the stick/pedals motion. Thus, the force-feel or haptic feedback is there to assist or guide the pilot in understanding what should be done to best recover from the IFSD but also give the pilot some means to adjust the desired helicopter command response to such IFSD.

By way of example, two types of haptic feedback may be installed for the parallel actuators, namely pre-loaded frictional feedback on collective and yaw commands and pre-loaded spring effect feedback on pitch and roll commands.

Furthermore, two types of haptic feedback management may be provided. One is that the parallel force transmission mechanism is a classical one as pre-loaded frictional or spring effect feedback. As such the only way to act on the perceived haptic feedback is via a command on one entry of this parallel force transmission mechanism. The other is that the parallel actuator motor is commanded to produce the desired torque and hence haptic feedback. The latter one may offer more degrees of freedom in haptic feedback management. Thus, such haptic feedback management must provide the pilot with a certain guiding force when the control is away from where it should be, as well as follow the pilot and provide a "trimmed" control position when this control approaches an acceptable rest position. Accordingly, the parallel actuation is preferably configured with the capability to provide different max speed, in accordance with the engines' states, and the capability to command a haptic force to guide but also follow the pilot during manual/pedals intervention especially in the critical flight case of IFSD and dormant engine recovery.

According to some aspects, the at least one series actuator may comprise a first series actuator and a second series actuator, wherein the pre-conditioning of the at least one series actuator may comprise: maximizing a first authorized stroke range for a first series actuator stroke of the first series actuator from a first reduced nominal stroke range authorized in the AEO mode to a first maximally available stroke range authorized upon occurrence of an IFSD, and maximizing a second authorized stroke range for a second series actuator stroke of the second series actuator from a second reduced nominal stroke range authorized in the AEO mode to a second maximally available stroke range authorized upon occurrence of an IFSD.

If desired, the first series actuator and the second series actuator may be identical series actuators. Series actuation configuration parameters may then be evenly distributed between the first series actuator and the second series actuator or among all the identical series actuators.

Alternatively, the first series actuator and the second series actuator may be different series actuators. The series actuation configuration parameters may then be unevenly distributed between the first series actuator and the second series actuator or among all the series actuators, depending on the specific characteristics of each series actuator.

According to some aspects, the reduced shifted stroke range for the series actuator stroke of the at least one series actuator for controlling flight operation of the rotorcraft in the AFR mode until occurrence of an IFSD may be provided only by the first maximally available stroke range of the first series actuator.

According to some aspects, the control logic may be configured for enabling the series actuator stroke of the at least one series actuator to be actuated in both the first maximally available stroke range and the second maximally available stroke range for controlling flight operation of the rotorcraft in response to occurrence of an IFSD in the AFR mode.

Another one of the above-described objects is solved by a FCS for a rotorcraft that comprises at least one main rotor with at least one main rotor actuator for adapting main rotor control dependent on a current flight condition of the rotorcraft, wherein main rotor actuator stroke of the at least one main rotor actuator is adjusted via series actuator stroke of at least one series actuator arranged upstream of the at least one main rotor actuator, wherein the at least one series actuator is coupled to a control lever that is connected to at least one parallel actuator, and wherein at least one first engine and at least one second engine are provided for powering the at least one main rotor. The FCS is configured for controlling flight operation of the rotorcraft at least in an AEO mode, in which the at least one first engine and the at least one second engine are powering the at least one main rotor, or in an AFR mode, in which only the at least one first engine is powering the at least one main rotor. More specifically, according to the present disclosure the FCS comprises a control logic configured for pre-conditioning the at least one series actuator upon entering the AFR mode for enabling rotorcraft control upon occurrence of an in-flight shutdown of the at least one first engine in the AFR mode, wherein pre-conditioning of the at least one series actuator comprises shifting a reduced nominal stroke range authorized for the series actuator stroke of the at least one series actuator in the AEO mode into a reduced shifted stroke range authorized for the series actuator stroke of the at least one series actuator in the AFR mode to enable authorization of an increased stroke range upon occurrence of an IFSD, the increased stroke range being adapted to provide sufficient control authority required for a recovery maneuver in response to occurrence of an IFSD.

Still another one of the above-described objects is solved by a method of controlling flight operation of a rotorcraft, wherein the rotorcraft comprises: at least one main rotor with at least one main rotor actuator for adapting main rotor control dependent on a current flight condition of the rotorcraft, wherein main rotor actuator stroke of the at least one main rotor actuator is adjusted via series actuator stroke of at least one series actuator arranged upstream of the at least one main rotor actuator, and wherein the at least one series actuator is coupled to a control lever that is connected to at least one parallel actuator; at least one first engine and at least one second engine for powering the at least one main rotor; and a FCS for controlling flight operation of the rotorcraft at least in an AEO mode, in which the at least one first engine and the at least one second engine are powering the at least one main rotor, or in an AFR mode, in which only the at least one first engine is powering the at least one main rotor. More specifically, according to the present disclosure the method comprises providing a control logic configured for pre-conditioning the at least one series actuator upon entering the AFR mode for enabling rotorcraft control upon occurrence of an in-flight shutdown of the at least one first engine in the AFR mode, wherein pre-conditioning of the at least one series actuator comprises shifting a reduced nominal stroke range authorized for the series actuator stroke of the at least one series actuator in the AEO mode into a reduced shifted stroke range authorized for the series actuator stroke of the at least one series actuator in the AFR mode to enable authorization of an increased stroke range upon occurrence of an IFSD, the increased stroke range being adapted to provide sufficient control authority required for a recovery maneuver in response to occurrence of an IFSD.

BRIEF DESCRIPTION OF DRAWINGS

Preferred embodiments of the disclosure are outlined by way of example in the following description with reference to the attached drawings. In these attached drawings, identical or identically functioning components and elements are labeled with identical reference numbers and characters and are, consequently, only described once in the following description.

DETAILED DESCRIPTION

Figure 1:
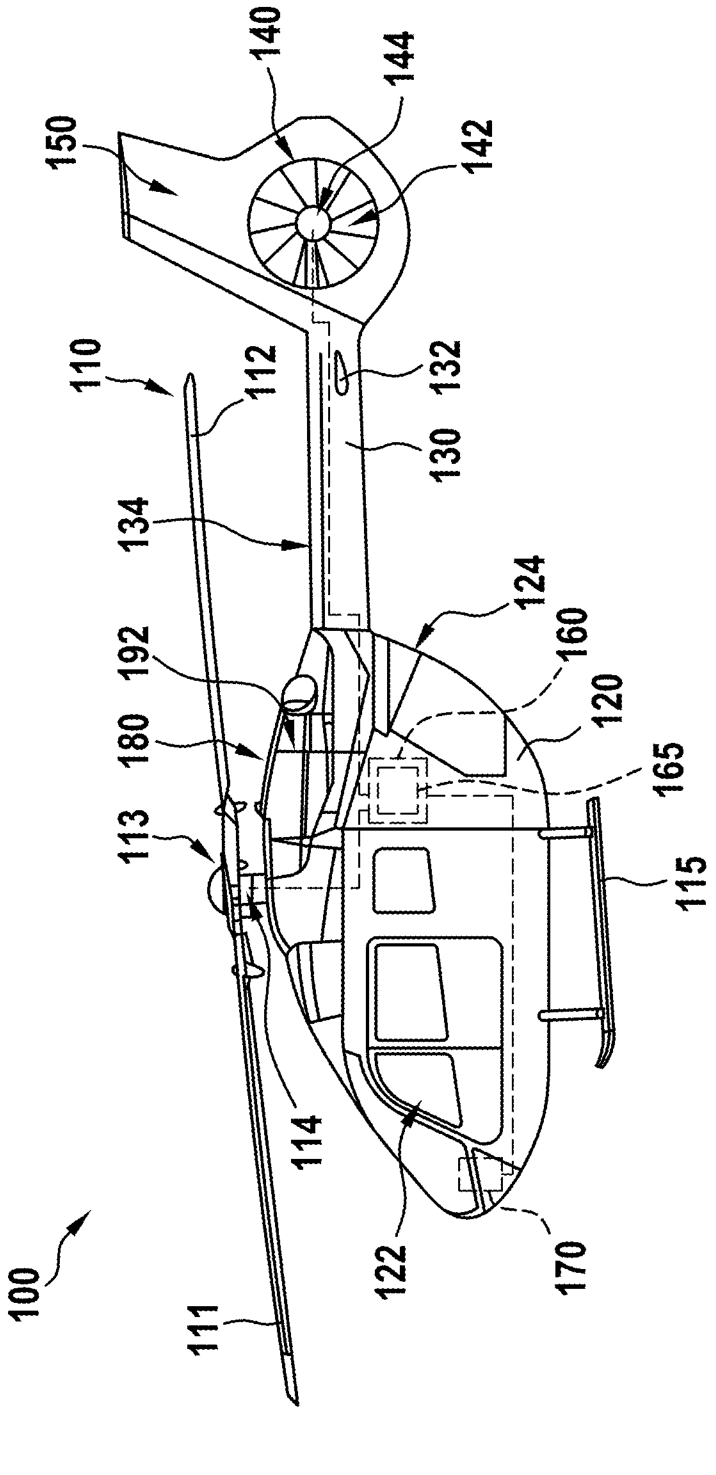
FIG. 1 shows a lateral view of an illustrative rotorcraft according to the present disclosure.

FIG. 1 shows an aircraft 100 that is illustratively embodied as a rotorcraft and, more particularly, as a helicopter. Thus, for purposes of simplicity and clarity, the aircraft 100 is hereinafter referred to as the "helicopter 100". The present disclosure is, however, not limited to helicopters and may likewise be applied to any other rotorcraft.

The helicopter 100 comprises at least one main rotor 110, by way of example a multi-blade main rotor, for providing lift and forward or backward thrust during operation. By way of example, the at least one main rotor 110 comprises a plurality of rotor blades which are connected at an associated rotor head 113 to a rotor shaft, which rotates in operation of the helicopter 100 about an associated rotor axis. Two rotor blades of the plurality of rotor blades are illustratively separately labelled with the reference signs 111, 112.

The at least one main rotor 110 further comprises at least one associated main rotor actuator 114. Suitable actuators which may be used to implement the associated main rotor actuator 114 are, however, well-known to the person skilled in the art, so that a detailed description thereof may be omitted, for brevity and conciseness.

Illustratively, the at least one main rotor actuator 114 is configured for adapting main rotor control of the at least one main rotor 110 dependent on a current flight condition of the helicopter 100. By way of example, a respective main rotor actuator stroke of the at least one main rotor actuator 114 is adjusted via series actuator stroke (e.g., series actuator stroke 205*c* in FIG. 2A) of at least one series actuator (e.g., series actuator 205 in FIG. 2A) arranged upstream of the at least one main rotor actuator 114. The at least one series actuator is illustratively coupled to a control lever (e.g., control lever 301 in FIG. 3A) that is connected to at least one parallel actuator (e.g., parallel actuator 375 in FIG. 3A).

By way of example, the helicopter 100 comprises a fuselage 120 and a landing gear 115 which is only illustratively of the skid-type. By way of example, a left-hand side of the fuselage 120 is shown and, thus, a portside wall of the fuselage 120 of the helicopter 100. Illustratively, the fuselage 120 forms an aircraft interior region that accommodates a cockpit 122 and that may further accommodate a cabin for passengers and/or cargo. Moreover, the fuselage 120 may be connected at a rear fuselage 124 to a tail boom 130 with a horizontal stabilizer 132. The tail boom 130 may be implemented as a slim beam element that comprises at least a tubular tail boom cone 134.

Illustratively, the helicopter 100 further comprises at least one preferentially shrouded counter-torque device 140 configured to provide counter-torque during operation, i.e., to counter the torque created by rotation of the at least one main rotor 110 for purposes of balancing the helicopter 100 in terms of yaw. The at least one counter-torque device 140 is illustratively provided at an aft section of the tail boom 130 and preferably comprises a tail rotor 142. The aft section of the tail boom 130 may further comprise a fin 150.

Preferably, the tail rotor 142 further comprises associated tail rotor actuators 144. Suitable actuators which may be used to implement the associated tail rotor actuators 144 are, however, well-known to the person skilled in the art, so that a detailed description thereof may be omitted, for brevity and conciseness.

Illustratively, the helicopter 100 comprises at least two engines 180, namely at least one first engine 192 and at least one second engine, for powering the at least one main rotor 110. At this point, it should be noted that only one first engine 192 is separately labeled in FIG. 1, as it is arranged on the left-hand side of the helicopter 100. However, the helicopter 100 is, by way of example, embodied with a twin-engine configuration having two engines which form the at least two engines 180 which, thus, comprise in addition to the engine 192 another engine that may e.g., be arranged on a right-hand side of the helicopter 100 such that it is not visible in FIG. 1.

The helicopter 100 further comprises a FCS 160 for controlling flight operation of the helicopter 100 dependent on different engines' states of the helicopter 100. By way of example, such engines' states may include:

a) an AEO state, in which the at least one first engine 192 and the at least one second engine are powering the at least one main rotor 110;

b) an AFR state, in which only the at least one first engine 192 is powering the at least one main rotor 110;

c) an IFSD during AFR state, in which the at least one first engine 192 in the AFR experiences an in-flight shutdown;

d) an OEI state, in which only the at least one second engine is powering the at least one main rotor 110, while the at least one first engine 192 is inoperative due to a previous in-flight shutdown;

e) a TEI state, in which neither of the at least one first engine 192 or the at least one second engine is powering the at least one main rotor 110, as both the at least one first engine 192 and the at least one second engine are inoperative.

If desired, depending on the engines' states or the transition therebetween, suitable FCS objectives may be computed and defined for control. Especially during AFR and upon occurrence of an IFSD of an active engine, an appropriate flight control strategy must be selected with corresponding FCS objectives. By way of example, depending on the flight condition upon occurrence of the IFSD, there may be different strategies required to maintain a safe flight state. For instance, strong deceleration even below the best rate of climb speed Vy may be favorable in order to minimize the altitude loss, or a suitable trim condition for minimal power, e.g., a small bank angle.

According to the present disclosure, the FCS 160 for controlling flight operation of the helicopter 100 at least in an AEO mode or in an AFR mode comprises a control logic 165 configured for pre-conditioning the at least one series actuator upon entering the AFR mode for enabling helicopter control upon occurrence of an IFSD of the at least one first engine 192 in the AFR. The FCS 160 may automatedly command the flight controls 170.

By way of example, the control logic 165 is configured to pre-condition the series actuator(s) with engagement of the AFR mode, e.g., SIO/SEO, such that control of the series actuators would achieve the FCS objectives and constraints. If desired, the pre-conditioning of the series actuator(s) may be used for realizing adaptions of flight controls in any one of all control axes (i.e., pitch axis, roll axis, collective axis, and yaw axis).

Figure 2A:
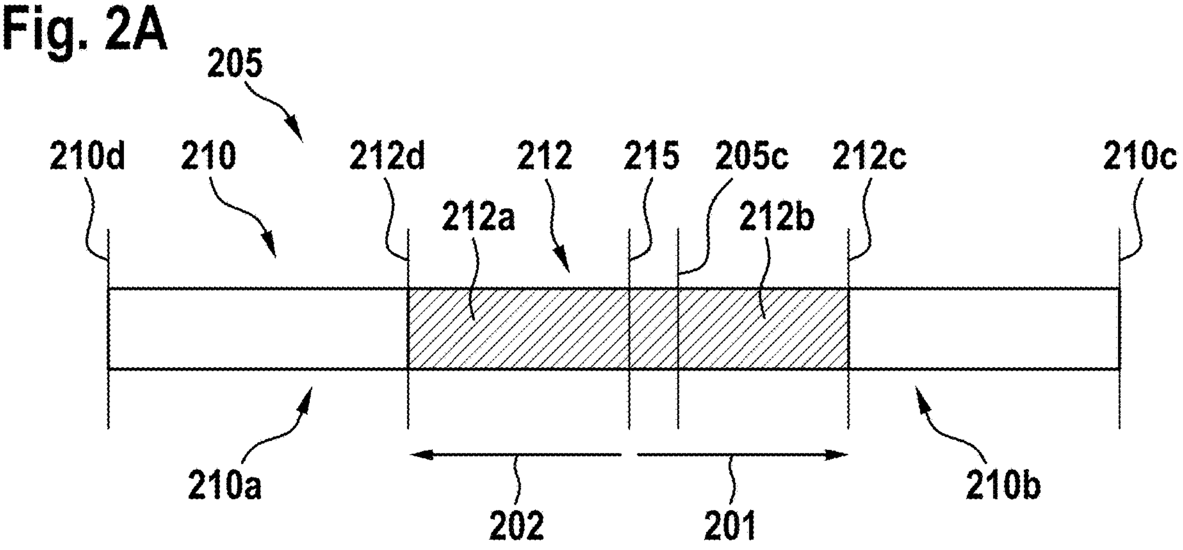
FIG. 2A shows an illustrative state of a series actuator of the rotorcraft of FIG. 1, where the rotorcraft is operating in AEO mode.
Figure 2B:
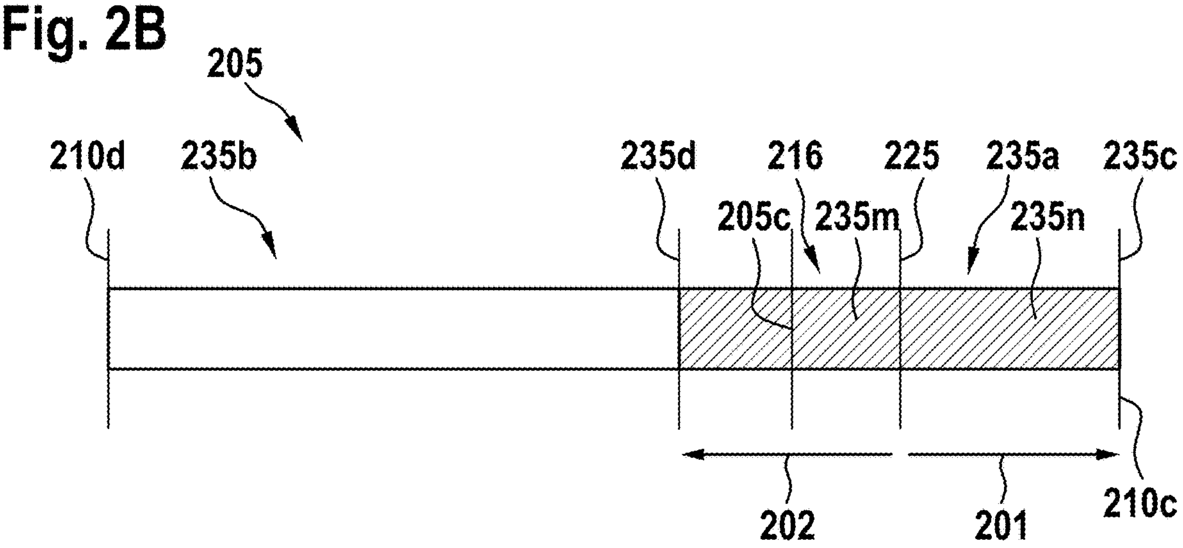
FIG. 2B shows an illustrative state of the series actuator of the rotorcraft of FIG. 1, where the rotorcraft is operating in AFR mode.
Figure 2C:
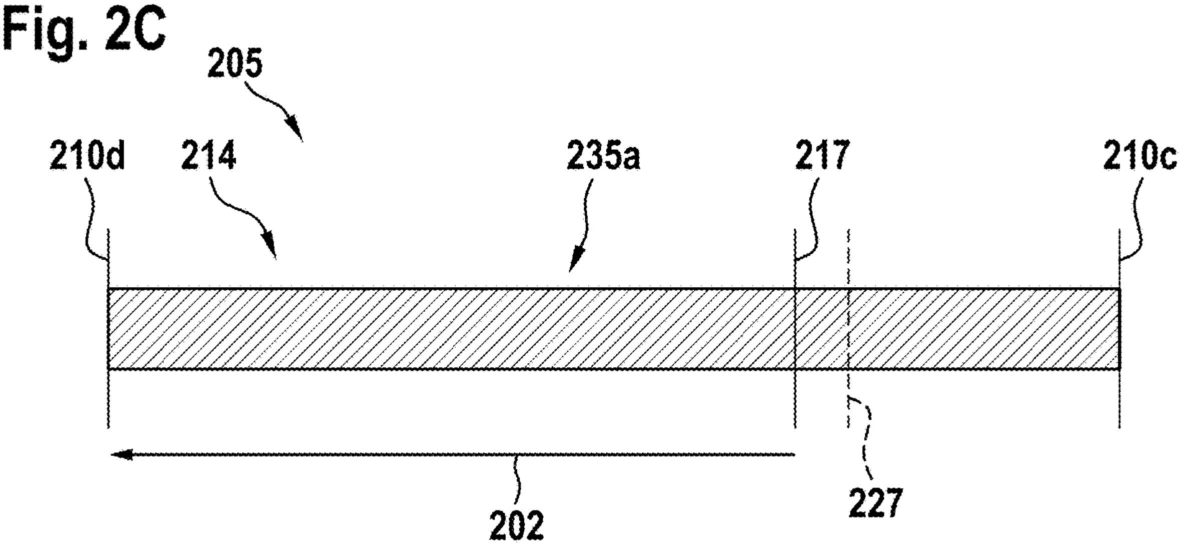
FIG. 2C shows an illustrative state of the series actuator of FIG. 2B upon occurrence of an IFSD.

FIG. 2A to FIG. 2C show an illustrative mechanism subjected to adaptation of variable serial actuator stroke ranges of a series actuator 205 of the helicopter 100 of FIG. 1. More specifically, the series actuator 205 in FIG. 2A is illustratively in a collective control axis of helicopter 100 that is operated in AEO mode. As shown in FIG. 2A, a reduced nominal stroke range 212 is authorized for a series actuator stroke of the at least one series actuator 205 in the AEO mode, such as e.g., a current series actuator stroke represented as a current series actuator stroke position 205*c*.

More specially, the at least one series actuator 205 may have a first end position 210*c* of a maximally possible stroke range 210 for the series actuator stroke 205*c* in a first operational direction 201 and a second end position 210*d* of the maximally possible stroke range 210 in a second operational direction 202. The maximally possible stroke range 210 represents the full available installed stroke range of the at least one series actuator 205 that would be theoretically available regardless the setting of the FCS. The reduced nominal stroke range 212 is an authorized stroke range that only uses part of the maximally possible stroke range 210. By way of example, during the AEO mode, the useable stroke range of the at least one series actuator 205 may be 50% of the maximally possible stroke range 210. Such authorization may be executed by the FCS via e.g., applying software stops.

As shown in FIG. 2A, a neutral stroke position 215 may be set by the FCS for the at least one series actuator 205. More specifically, the control logic 165 of FIG. 1 is configured for setting a neutral stroke position 215 for the series actuator stroke 205*c* of the at least one series actuator 205 in the maximally available stroke range 210.

By way of example, the neutral stroke position 215 may be a centered stroke position in the AEO mode that evenly divides the maximally available stroke range 210 into two maximally available stroke regions 210*a*, 210*b* for stroke into two opposite stroke directions 201, 202. Illustratively, the reduced nominal stroke range 212 may comprise two reduced authorized stroke regions 212*a*, 212*b* which are smaller than the two maximally available stroke regions 210*a*, 210*b*. Illustratively, the reduced nominal stroke range 212 is evenly divided, by the neutral stroke position 215 for the series actuator stroke 205*c* of the at least one series actuator 205, into reduced authorized stroke regions 212*a*, 212*b*.

During the AEO mode, the series actuator stroke 205*c* may illustratively be executed in the first operational direction 201 from the neutral stroke position 215 until a first end position 212*c* of the reduced nominal stroke range 212 within the reduced authorized stroke region 212*b*. Strokes executed in the first operational direction 201 may represent extensions of the at least one series actuator 205, which may lead to an upward control of the collective pitch of the main rotor 110 of FIG. 1. Illustratively, the series actuator stroke 205*c* is positioned between the neutral stroke position 215 and the first end position 212*c* of the reduced nominal stroke range 212 within the reduced authorized stroke region 212*b*.

By way of example, the series actuator stroke 205*c* may also be executed in the second operational direction 202 from the neutral stroke position 215 until a second end position 212*d* of the reduced nominal stroke range 212 within the reduced authorized stroke region 212*a* is reached. Strokes executed in the second operational direction 202 may represent retractions of the at least one series actuator 205, which may lead to a downward control of the collective pitch of the main rotor 110 of FIG. 1.

The series actuator stroke 205*c* shown in FIG. 2A is illustratively executed in the second operational direction 202 from the neutral stroke position 215 towards the second end position 212*d*. However, it should be noted that the series actuator stroke 205*c* may also be executed from a current series actuator position that is different from the neutral stroke position 215. For instance, if the current series actuator position is located within the reduced authorized stroke region 212*b*, the series actuator stroke 205*c* may allow for relatively more retraction and relatively less extension of the at least one series actuator 205. Alternatively, the series actuator stroke 205*c* may also be executed from a current series actuator position that would allow relatively more extension and relatively less retraction of the at least one series actuator 205 as shown in FIG. 2B.

FIG. 2B shows the series actuator 205 of FIG. 2A upon entering the AFR mode. In FIG. 2B, a reduced shifted stroke range 216 is authorized for the series actuator stroke 205*c* of the at least one series actuator 205 in the AFR mode. By way of example, pre-conditioning of the at least one series actuator 205 upon entering the AFR mode comprises shifting a reduced nominal stroke range 212 authorized for the series actuator stroke 205*c* of the at least one series actuator 205 in the AEO mode into the reduced shifted stroke range 216 authorized for the series actuator stroke 205*c* of the at least one series actuator 205 in the AFR mode.

More specifically, pre-conditioning of the at least one series actuator 205 upon entering the AFR mode may comprise limiting the maximally available stroke range 210 to the reduced shifted stroke range 216 in the AFR mode until occurrence of an IFSD of the at least one first engine 192 in the AFR mode. Illustratively, the reduced shifted stroke range 216 is smaller than the maximally available stroke range 210.

As shown in FIG. 2B, pre-conditioning of the at least one series actuator 205 upon entering the AFR mode can further comprise shifting the neutral stroke position 215 for the series actuator stroke 205*c* of the at least one series actuator 205 from the centered stroke position in the AEO mode to a shifted stroke position 225 in the AFR mode. Illustratively, the shifted stroke position 225 is adapted to enable an increase of control authority for main rotor control to enable a required recovery maneuver in response to occurrence of an IFSD, which is described in detail below with reference to FIG. 2C.

Turning now back to FIG. 2B, upon entering the AFR mode, a neutral stroke position 215 for the series actuator stroke 205*c* of the at least one series actuator 205 is shifted to a shifted neutral stroke position 225. Illustratively, the reduced shifted stroke range 216 is evenly divided, by the shifted neutral stroke position 225 for the series actuator stroke of the at least one series actuator, into two shifted stroke regions 235*m*, 235*n*. In some embodiments, the reduced shifted stroke range 216 for the series actuator stroke 205*c* of the at least one series actuator 205 in the AFR mode is equal to the reduced nominal stroke range 212.

In other words, pre-conditioning of the at least one series actuator 205 upon entering the AFR mode will shift the authorized stroke range, but will not immediately increase the authorized stroke range to a stroke range greater than that authorized in the AEO mode. For instance, the reduced shifted stroke range 216 in FIG. 2B may still use only 50% of the maximally possible stroke range 210. However, the authorized part of the maximally possible stroke range 210 is illustratively shifted towards the first end position 210*c* of the maximally possible stroke range 210.

As shown in FIG. 2B, an authorized operational stroke range 235*a* for series actuator stroke during the AFR mode until occurrence of an IFSD is equal to the reduced nominal stroke range 212 during the AEO mode. As such, until occurrence of an IFSD in the AEO mode, the series actuator stroke 205*c* may illustratively be executed in the first operational direction 201 from the shifted neutral stroke position 225 until a first end position 235*c* of the reduced shifted stroke range 216 within the shifted stroke region 235*n*. By way of example, until occurrence of an IFSD in the AEO mode, the series actuator stroke 205*c* may also be executed in the second operational direction 202 from the shifted neutral stroke position 225 until a second end position 235*d* of the reduced shifted stroke range 216 within the shifted stroke region 235*m*.

Similar to the series actuator stroke 205*c* during the AEO mode, the series actuator stroke 205*c* during the AFR mode until occurrence of an IFSD may also be executed from a current series actuator position that is different from the shifted neutral stroke position 225. For instance, the illustrated series actuator stroke 205*c* of FIG. 2B has both an initial point and a final point within the shifted stroke region 235*m*. The initial and final points of the series actuator stroke 205*c* during the AFR mode until occurrence of an IFSD may be located anywhere within the reduced shifted stroke range 216. The region outside the reduced shifted stroke range 216 is, however, an unauthorized region 235*b* that is unavailable until occurrence of an IFSD.

FIG. 2C shows the series actuator 205 of FIG. 2B in the AFR mode responding to occurrence of an IFSD. With reference to FIG. 2A to FIG. 2C, pre-conditioning of the at least one series actuator 205 comprises shifting a reduced nominal stroke range 212 authorized for the series actuator stroke 205*c* of the at least one series actuator 205 in the AEO mode into a reduced shifted stroke range 216 authorized for the series actuator stroke 205*c* of the at least one series actuator 205 in the AFR mode to enable authorization of an increased stroke range 214 upon occurrence of an IFSD, the increased stroke range 214 being adapted to provide sufficient control authority required for a recovery maneuver in response to occurrence of an IFSD. Illustratively, the increased stroke range 214 corresponds to the maximally possible stroke range 210 of FIG. 2A, i.e., the stroke range between the first and second end positions 210*c*, 210*d*.

Furthermore, the mechanism of variable serial actuator stroke ranges for the series actuator stroke 205*c* of the at least one series actuator 205 as shown in FIG. 2A to FIG. 2C illustratively exemplifies a method of operating the helicopter 1 according to the present disclosure.

More specifically, as shown in FIG. 2A to FIG. 2C, the method comprises providing the control logic 165 of FIG. 1 configured for pre-conditioning the at least one series actuator 205 upon entering the AFR mode for enabling helicopter control upon occurrence of an IFSD of the at least one first engine 192 in the AFR mode, wherein pre-conditioning of the at least one series actuator 205 comprises shifting a reduced nominal stroke range 212 authorized for the series actuator stroke 205*c* of the at least one series actuator 205 in the AEO mode as shown in FIG. 2A into a reduced shifted stroke range 216 authorized for the series actuator stroke 205*c* of the at least one series actuator 205 in the AFR mode as shown in FIG. 2B to enable authorization of an increased stroke range 214 upon occurrence of an IFSD as shown in FIG. 2C. Illustratively, the increased stroke range 214 is adapted to provide sufficient control authority required for a recovery maneuver in response to occurrence of an IFSD.

Illustratively, pre-conditioning of the at least one series actuator 205 upon entering the AFR mode may comprise shifting of the neutral stroke position 215 for the series actuator stroke 205*c* of the at least one series actuator 205 to a maximally shifted neutral stroke position 227 to provide fully available control authority upon occurrence of an IFSD. By way of example, when the reduced nominal stroke range 212 in FIG. 2A is shifted in the first direction 201 to arrive the authorized operational stroke range 235*a* in FIG. 2B, a maximally shifted authorized operational stroke range 235*a* would share a limit in the first direction 201 with the maximally possible stroke range 210. As such, the first end position 235*c* of the shifted authorized operational stroke range 235*a* would be the first end position 210*c* of the maximally possible stroke range 210. The shifted neutral stroke position 225 of FIG. 2B in this maximally shifted scenario, therefore, would be the maximally shifted neutral stroke position 227 as shown in FIG. 2C.

More specifically, as shown in FIG. 2B and FIG. 2C, pre-conditioning of the at least one series actuator 205 upon entering the AFR mode comprises increasing the reduced shifted stroke range 216 for the series actuator stroke 205*c* to a maximally available stroke range 210 to provide fully available control authority upon occurrence of an IFSD. That is, pre-conditioning of the at least one series actuator 205 may comprise increasing the reduced nominal stroke range 212 at actuator level to reach the maximally available stroke range 210 for controlling of the helicopter 100 upon IFSD during AFR mode. Following the IFSD, the FCS 160 will then be able to use the maximally available stroke range 210 of the series actuator stroke 205*c*.

As shown in FIG. 2C, the increased stroke range 214 upon occurrence of an IFSD may allow the at least one series actuator 205 to be actuated up to the first end position 210*c* and the second end position 210*d* of the maximally possible stroke range 210. A stroke region between the maximally shifted neutral stroke position 227 and the second end position 210*d* may be entirely used to execute the series actuator stroke 205*c* in the second operational direction 202 for achieving e.g., a sufficient reduction in collective pitch in 0.5 seconds according to the objectives and constraints of the FCS 160 upon the occurrence of an IFSD.

Illustratively, an actual stroke position 217 may, however, not be at the maximally shifted neutral stroke position 227 when the IFSD occurs. In this scenario, the entire stroke region between the actual stroke position 217 and the second end position 210*d* may be the authorized operational stroke range 235*a* for the objective of reducing a collective pitch of the main rotor 110 in FIG. 1 or, if appliable, to rapidly modify the blade angles of both main rotor 110 and tail rotor 142 of FIG. 1.

It should be noted that the increased authorized operational stroke range 235*a* may be used not only for reduction of the main rotor collective pitch, but also to other main rotor control for achieving a safe flight condition. As such, the illustrative second operational direction 202 may represent any direction that is required for realizing such main rotor controls and/or tail rotor controls, including e.g., increasing a main rotor cyclic pitch.

Illustratively, the shift of the authorized operational stroke range 235*a* for the series actuator stroke 205*c* of the at least one series actuator 205 upon entering the AFR mode may be compensated by a move of the control lever in an opposite direction. Such a compensation may be provided by at least one parallel actuator that is connected to the control lever as shown in FIG. 3A.

Figure 3A:
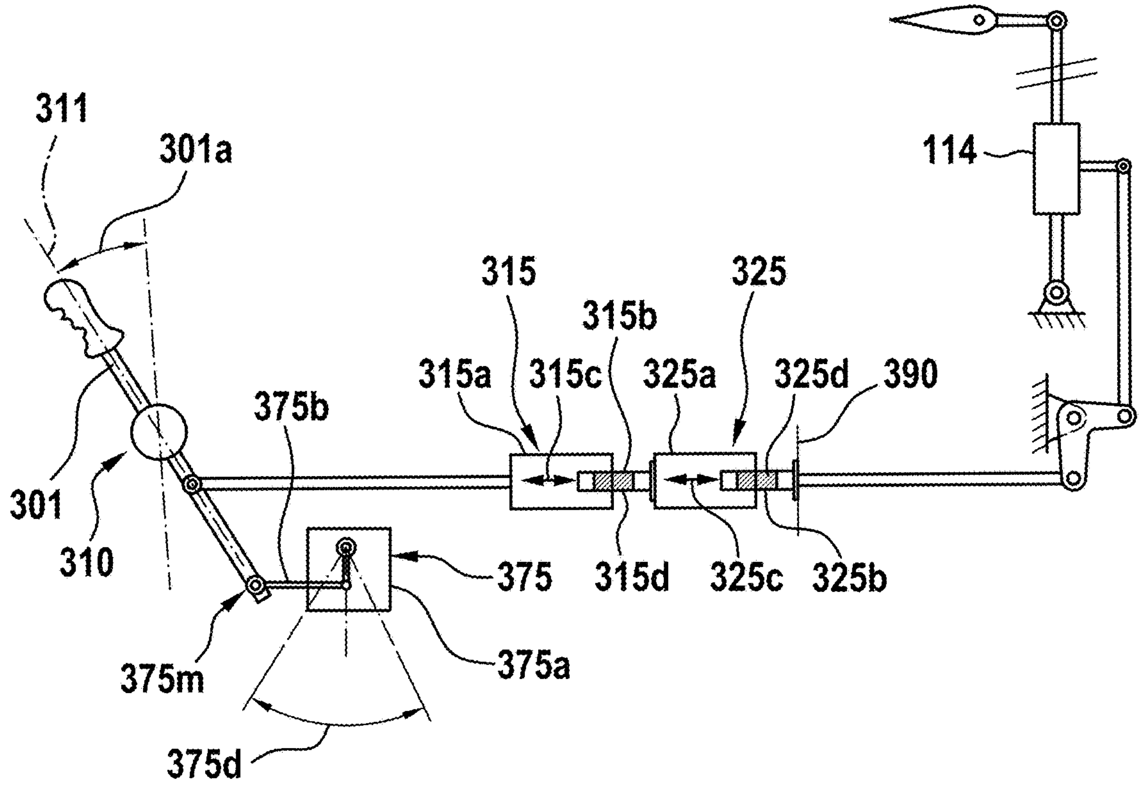
FIG. 3A shows an illustrative FCS of the rotorcraft of FIG. 1, where the rotorcraft is operating in AEO mode.

FIG. 3A shows the at least one series actuator, that is illustratively embodied as a first series actuator 315 and a second series actuator 325 which are illustratively arranged upstream of the at least one main rotor actuator 114 of FIG. 1 in the AEO mode. The first and second series actuators 315, 325 are illustratively coupled to a control lever 301 that is connected to at least one parallel actuator 375.

As shown in FIG. 3A, the at least one series actuator comprises the first series actuator 315 and the second series actuator 325. Each one of the first series actuator 315 and the second series actuator 325 may have an individual neutral stroke position. Illustratively, the first series actuator 315 may be identical to the second series actuator 325. The neutral stroke position 215 in FIG. 2A illustrates the neutral stroke position of the first and second series actuators 315, 325.

By way of example, the first and second series actuators 315, 325 may respectively have two series actuator bodies 315*a*, 325*a* and two series actuator rods 315*b*, 325*b*. Illustratively, the first series actuator rod 315*b* may e.g., be fully retracted into or fully extracted from the first series actuator body 315*a*. As such, the whole length of the series actuator body 315*a* may represent a first maximally available stroke range (315*e* in FIG. 3B). However, similar to the at least one series actuator 205 in FIG. 2A, the first series actuators 315 in the AEO mode may only be authorized for a first authorized stroke range which is illustratively embodied as a first reduced nominal stroke range 315*d*, for a first series actuator stroke 315*c*. Likewise, the second series actuators 325 in the AEO mode may only be authorized for a second authorized stroke range which is illustratively embodied as a second reduced nominal stroke range 325*d*, for a second series actuator stroke 325*c*. If desired, the first reduced nominal stroke range 315*d* may be equal to the second reduced nominal stroke range 325*d*. As such, the sum of the first and second reduced nominal stroke ranges 315*d*, 325*d* of the first and second series actuators 315, 325 may provide the entire reduced nominal stroke range 212 of the at least one series actuator 205 in FIG. 2A.

Illustratively, the at least one parallel actuator 375 may have a parallel actuator body 375*a* and a parallel actuator rod 375*b*. A parallel actuator stroke 375*c* may be executed within a parallel actuator stroke range 375*d* such that a current parallel actuator position 375*m* may be changed correspondingly. Accordingly, the control lever 301 may be moved to different control positions.

As shown in FIG. 3A, the control lever 301 has illustratively a neutral control position 310. By way of example, this neutral control position 310 corresponds in the AEO mode to a nominal neutral control position 311 at which the control lever 301 may be kept in the AEO mode. Illustratively, the nominal neutral control position 311 may correspond to a trim position 390 and, thus, correspond to a "trim" state.

Illustratively, a displacement 301*a* of the control lever 301 in FIG. 3A may appear when pre-conditioning the at least one series actuator 205 upon entering the AFR mode as shown in FIG. 2B. For instance, if a reduced nominal stroke range of a collective series actuator is shifted to a reduced shifted stroke range corresponding to a "collective up" part of a maximally available stroke range, a displacement 301*a* would occur to a collective lever (e.g., control lever 301). The collective lever needs to be lowered as the trim position 390 should remain substantially at the same position.

By way of example, pre-conditioning of the at least one series actuator 205 upon entering the AFR mode may further comprise adjusting the at least one parallel actuator 375 for compensating shifting of the neutral stroke position 215 for the series actuator stroke 205*c* of the at least one series actuator 205. More specifically, the control logic 165 of FIG. 1 is preferably configured for pre-conditioning the at least one parallel actuator 205 upon entering the AFR mode for enabling helicopter control upon occurrence of an IFSD of the at least one first engine 192 of FIG. 1 in the AFR mode by adapting the current parallel actuator position 375*m* of the at least one parallel actuator 375 for compensating the shifting of the neutral stroke position 215 for the series actuator stroke 205*c* of the at least one series actuator 205. By way of example, the current parallel actuator position 375*m* as shown in FIG. 3A may be adapted to the parallel actuator position 375*n* as shown in FIG. 3B.

Figure 3B:
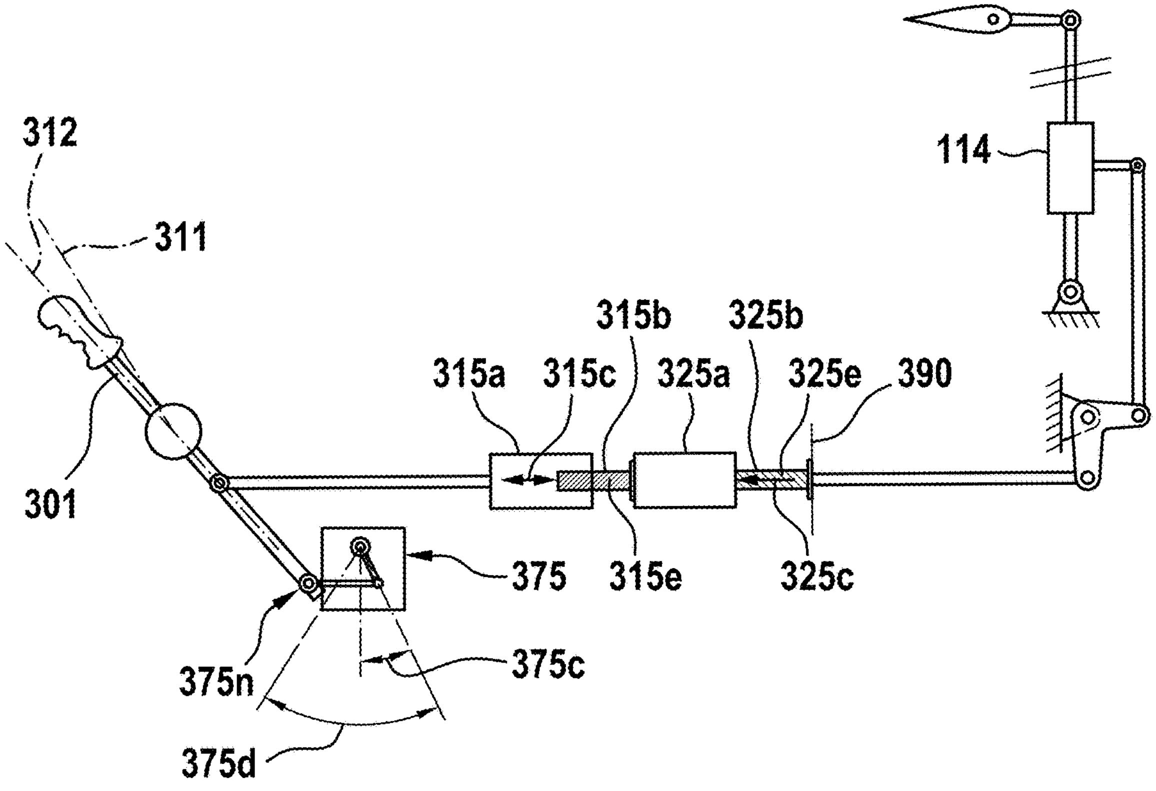
FIG. 3B shows the FCS of FIG. 3A, where the rotorcraft is operating in AFR mode.

FIG. 3B shows the first and second series actuators 315, 325 which are arranged upstream of the at least one main rotor actuator 114 of FIG. 1 in the AFR mode with a shifted neutral stroke position which is compensated by the at least one parallel actuator 375.

More specifically, the pre-conditioning of the first and second series actuators 315, 325 upon entering the AFR mode preferably comprises maximizing the first authorized stroke range for the first series actuator stroke 315*c* of the first series actuator 315 from the first reduced nominal stroke range 315*d* authorized in the AEO mode to a first maximally available stroke range 315*e* authorized upon occurrence of an IFSD.

As shown in FIG. 3B, the pre-conditioning of the first and second series actuators 315, 325 upon entering the AFR mode may further comprise maximizing the second authorized stroke range for the second series actuator stroke 325*c* of the second series actuator 325 from the second reduced nominal stroke range 325*d* authorized in the AEO mode to a second maximally available stroke range 325*e* authorized upon occurrence of an IFSD. However, such a pre-conditioning would lead to a dissimilar or asymmetric configuration of the first and second series actuators 315, 325, which may only be required if different actuator types are used to implement the first and second series actuators 315, 325. Therefore, the following is only described by way of example and not for limiting the disclosure accordingly.

By way of example, the reduced shifted stroke range 216 in FIG. 2B for the series actuator stroke 205*c* of the at least one series actuator 205 for controlling flight operation of the helicopter 100 in the AFR mode until occurrence of an IFSD may be provided only by the first maximally available stroke range 315*e* of the first series actuator 315. More specifically, with reference to FIG. 2B, the authorized operational stroke range 235*a* for the series actuator stroke 205*c* of the at least one series actuator 205 for controlling flight operation of the helicopter 100 in FIG. 1 in the AFR mode until occurrence of an IFSD may be provided only by the first maximally available stroke range 315*e* of the first series actuator 315. Accordingly, the second maximally available stroke range 325*e* of the second series actuator 325 may be the unauthorized region 235*b* of the at least one series actuator 205 that is unavailable in the AFR mode until occurrence of an IFSD.

Illustratively, the second series actuator rod 325*b* may be fully extracted from the second series actuator body 325*a* such that an overall neutral stroke position of the first and second series actuators 315, 325 is shifted to a maximally shifted neutral stroke position to provide fully available control authority upon occurrence of an IFSD. However, it should be noted that such shifted overall neutral stroke position may also be provided by extracting only the first series actuator rod 315*b* from the first series actuator body 315*a* or extracting both series actuator rods from both series actuator bodies. If desired, the at least one series actuator may comprise more than two series actuators, and a shifted overall neutral stroke position may be provided by adjusting relative position(s) of one or more of the series actuator rods and corresponding series actuator bodies.

Illustratively, the control logic 165 of FIG. 1 may be configured for enabling the series actuator stroke, e.g., the first and second series actuator strokes 315*c*, 325*c* of the first and second series actuators 315, 325 to be actuated in both the first maximally available stroke range 315*e* and the second maximally available stroke range 325*e* for controlling flight operation of the helicopter 100 in response to occurrence of an IFSD in the AFR mode.

By way of example, in response to occurrence of an IFSD in the AFR mode, the authorized operational stroke range 235*a* in FIG. 2B (e.g., the first maximally available stroke range 315*e*) may be extended into the previously unauthorized region 235*b* (e.g., the second maximally available stroke range 325*e*) such that the increased stroke range 214 as shown in FIG. 2C is enabled to provide sufficient control authority required for a recovery maneuver in response to occurrence of an IFSD.

As shown in FIG. 3B, the shifted overall neutral stroke position for the first and second series actuator strokes 315*c*, 325*c* of the first and second series actuators 315, 325 must be compensated by the at least one parallel actuator 375 by adapting the current parallel actuator position 375*n* of the at least one parallel actuator 375.

More specifically, with reference to FIG. 3A and FIG. 3B, trimming, i.e., adapting the current parallel actuator position 375*n* of the at least one parallel actuator 375 for compensating the shifting comprises moving, by means of the at least one parallel actuator 375, the neutral control position 310 of the control lever 301 from the nominal neutral control position 311 in the AEO mode to a shifted neutral control position 312 in the AFR mode which differs from the nominal neutral control position 311. As such, the trim position 390 may substantially remain at the same position, while the neutral control position 310 of the control lever 301 is moved substantially to the shifted neutral control position 312.

Illustratively, the shifted neutral control position 312 may be adapted to allow the series actuator stroke, e.g., the first and second series actuator strokes 315*c*, 325*c* of the first and second series actuators 315, 325, with increased authority. For instance, the control lever 301 at the shifted neutral control position 312 may have more margin to be moved upwards and actuate the first and second series actuator strokes 315*c*, 325*c* of the first and second series actuators 315, 325 using both the first maximally available stroke range 315*e* and the second maximally available stroke range 325*e*.

By way of example, the control logic 165 of FIG. 1 may be configured for adapting a force-feel feedback to a pilot of the helicopter, via associated force-feel characteristics of the parallel actuator 375. If desired, the control logic 165 may adapt the force-feel characteristics in the AFR mode during an IFSD. Such force-feel characteristics may be mechanized by increasing breakout forces and in general control forces in the direction which is opposed to the FCS controls in case of an IFSD in the AFR mode. The FCS controls may include controlling of the at least one series actuator and/or the at least one parallel actuator to achieve any suitable FCS objectives and constraints depending on the current engines' state to maintain a safe flight.

It should be noted that the above described embodiments are merely described to illustrate possible implementations, but not in order to restrict the present disclosure thereto. Instead, multiple modifications and variations of the above described embodiments are possible and should, therefore, also be considered as being part of the disclosure.

For instance, according to FIG. 2A to FIG. 2C, the reduced shifted stroke range 216 is shifted and reaches the end position 210*c* of the maximally possible stroke range 210 in the first operational direction 201. However, if desired, the reduced shifted stroke range 216 may only be shifted towards the end position 210*c* to be close to the end position 210*c* in the first operational direction 201. Alternatively, the reduced shifted stroke range 216 may be shifted in the second operational direction 202 to reach or to be close to the end position 210*d* of the maximally possible stroke range 210.

Furthermore, according to FIG. 3A to FIG. 3B, authorized stroke ranges for the first and second series actuator strokes 315*c*, 325*c* of the first and second series actuators 315, 325 are maximized from the first and second reduced nominal stroke ranges 315*d*, 325*d* authorized in the AEO mode to the first and second maximally available stroke ranges 315*e*, 325*e* authorized upon occurrence of an IFSD to provide sufficient control authority for a downward control of the collective pitch. However, if desired, the sufficient control authority may be alternatively provided in another direction that is required for realizing main rotor controls and/or tail rotor controls, such as upward control of the collective pitch, increasing a main rotor cyclic pitch, and applying adjustments in roll axis and/or yaw axis.

REFERENCE LIST

100 rotary wing aircraft
110 multi-blade main rotor
111, 112 rotor blades
113 rotor head
114 main rotor actuator
115 landing gear
120 fuselage
122 cockpit
124 rear fuselage
130 tail boom
132 horizontal stabilizer
134 tail boom cone
140 counter-torque device
142 tail rotor
144 tail rotor actuator
150 fin
160 flight control system
165 control logic
170 flight controls
180 rotorcraft engines
192 engine that is powering the main rotor in AFR mode
201 first operational direction for series actuator stroke
202 second operational direction for series actuator stroke
205 series actuator
205*c* series actuator stroke
210 maximally possible stroke range for series actuator stroke

210*a*, 210*b* evenly divided maximally available stroke regions

210*c*, 210*d* end positions of maximally possible stroke range for series actuator stroke

212 reduced nominal stroke range for series actuator stroke

212*a*, 212*b* evenly divided reduced authorized stroke regions

212*c*, 212*d* end positions of reduced nominal stroke range for series actuator stroke

214 increased stroke range for series actuator stroke

215 neutral stroke position for series actuator stroke

216 reduced shifted stroke range for series actuator stroke

217 actual stroke position for series actuator stroke

225 shifted neutral stroke position for series actuator stroke

227 maximally shifted neutral stroke position for series actuator stroke

235*a* authorized operational stroke range for series actuator stroke

235*b* unauthorized region

235*c*, 235*d* end positions of authorized operational stroke range for series actuator stroke

235*m*, 235*n* evenly divided shifted stroke regions for series actuator stroke

301 control lever

301*a* displacement of control lever

310 neutral control position of control lever

311 nominal neutral control position

312 shifted neutral control position

315, 325 series actuator

315*a*, 325*a* series actuator body

315*b*, 325*b* series actuator rod

315*c*, 325*c* series actuator stroke

315*d* first reduced nominal stroke range

315*e* first maximally available stroke range

325*d* second reduced nominal stroke range

325*e* second maximally available stroke range

375 parallel actuator

375*a* parallel actuator body

375*b* parallel actuator rod

375*c* parallel actuator stroke

375*d* parallel actuator stroke range

375*m*, 375*n* current parallel actuator positions

390 trim position for collective control

What is claimed is:

1. A rotorcraft comprising:

at least one main rotor with at least one main rotor actuator for adapting main rotor control dependent on a current flight condition of the rotorcraft, wherein main rotor actuator stroke of the at least one main rotor actuator is adjusted via series actuator stroke of at least one series actuator arranged upstream of the at least one main rotor actuator, and wherein the at least one series actuator is coupled to a control lever that is connected to at least one parallel actuator;

at least one first engine and at least one second engine for powering the at least one main rotor;

a flight control system configured for controlling flight operation of the rotorcraft at least in an All Engines Operative (AEO) mode, in which the at least one first engine and the at least one second engine are powering the at least one main rotor, and in an asymmetric flight regime (AFR) mode, in which only the at least one first engine is powering the at least one main rotor, the flight control system comprising:

a control logic configured for pre-conditioning the at least one series actuator upon entering the AFR mode for enabling rotorcraft control upon occurrence of an in-flight shutdown (IFSD) of the at least one first engine in the AFR mode, wherein pre-conditioning of the at least one series actuator comprises shifting a reduced nominal stroke range authorized for the series actuator stroke of the at least one series actuator in the AEO mode into a reduced shifted stroke range authorized for the series actuator stroke of the at least one series actuator in the AFR mode, and wherein the control logic is configured, upon occurrence of an IFSD, to authorize the series actuator stroke in at least a portion of a region outside the reduced shifted stroke range that was unauthorized for the series actuator stroke in the AFR mode before occurrence of the IFSD.

2. The rotorcraft of claim 1, wherein the control logic is configured, upon occurrence of the IFSD, to increase the reduced shifted stroke range for the series actuator stroke to a maximally available stroke range to provide fully available control authority.

3. The rotorcraft of claim 1, wherein pre-conditioning of the at least one series actuator upon entering the AFR mode comprises shifting of a neutral stroke position of the at least one series actuator to a maximally shifted neutral stroke position to provide fully available control authority upon occurrence of an IFSD, and adjusting the at least one parallel actuator for compensating shifting of the neutral stroke position of the at least one series actuator.

4. The rotorcraft of claim 1, wherein the control logic is configured for setting a neutral stroke position for the series actuator stroke of the at least one series actuator in a maximally available stroke range, wherein the neutral stroke position is a centered stroke position in the AEO mode that evenly divides the maximally available stroke range into two maximally available stroke regions for stroke in two opposite stroke directions, and wherein the reduced nominal stroke range comprises two reduced authorized stroke regions which are smaller than the two maximally available stroke regions.

5. The rotorcraft of claim 4, wherein pre-conditioning of the at least one series actuator upon entering the AFR mode comprises shifting the neutral stroke position for the series actuator stroke of the at least one series actuator from the centered stroke position in the AEO mode to a shifted neutral stroke position in the AFR mode, the shifted neutral stroke position being adapted to enable an increase of control authority for main rotor control to enable a required recovery maneuver in response to occurrence of an IFSD.

6. The rotorcraft of claim 5, wherein the reduced shifted stroke range is evenly divided, by the shifted neutral stroke position for the series actuator stroke of the at least one series actuator, into two shifted stroke regions.

7. The rotorcraft of claim 5, wherein the control logic is configured for pre-conditioning the at least one parallel actuator upon entering the AFR mode for enabling rotorcraft control upon occurrence of an IFSD of the at least one first engine in the AFR mode by adapting a current parallel actuator position of the at least one parallel actuator for compensating the shifting of the neutral stroke position for the series actuator stroke of the at least one series actuator.

8. The rotorcraft of claim 7, wherein adapting the current parallel actuator position of the at least one parallel actuator for compensating the shifting comprises moving, by means of the at least one parallel actuator, a neutral control position of the control lever from a nominal neutral control position in the AEO mode to a shifted neutral control position in the AFR mode which differs from the nominal neutral control position, the shifted neutral control position being adapted to allow the series actuator stroke of the at least one series actuator with increased authority.

9. The rotorcraft of claim 1, wherein pre-conditioning of the at least one series actuator upon entering the AFR mode comprises limiting a maximally available stroke range to the reduced shifted stroke range in the AFR mode until occurrence of an IFSD of the at least one first engine in the AFR mode, wherein the reduced shifted stroke range is smaller than the maximally available stroke range.

10. The rotorcraft of claim 9, wherein the reduced shifted stroke range is equal to the reduced nominal stroke range.

11. The rotorcraft of claim 1, wherein the control logic is configured for adapting a force-feel feedback to a pilot of the rotorcraft, via associated force-feel characteristics of the at least one parallel actuator.

12. The rotorcraft of claim 1, wherein the at least one series actuator comprises a first series actuator and a second series actuator, and wherein the pre-conditioning of the at least one series actuator comprises:

maximizing a first authorized stroke range for a first series actuator stroke of the first series actuator from a first reduced nominal stroke range authorized in the AEO mode to a first maximally available stroke range authorized upon occurrence of an IFSD, and maximizing a second authorized stroke range for a second series actuator stroke of the second series actuator from a second reduced nominal stroke range authorized in the AEO mode to a second maximally available stroke range authorized upon occurrence of an IFSD.

13. The rotorcraft of claim 12, wherein the reduced shifted stroke range for the series actuator stroke of the at least one series actuator for controlling flight operation of the rotorcraft in the AFR mode until occurrence of an IFSD is provided only by the first maximally available stroke range of the first series actuator.

14. The rotorcraft of claim 13, wherein the control logic is configured for enabling the series actuator stroke of the at least one series actuator to be actuated in both the first maximally available stroke range and the second maximally available stroke range for controlling flight operation of the rotorcraft in response to occurrence of an IFSD in the AFR mode.

15. A flight control system for a rotorcraft that includes at least one main rotor with at least one main rotor actuator for adapting main rotor control dependent on a current flight condition of the rotorcraft, wherein main rotor actuator stroke of the at least one main rotor actuator is adjusted via series actuator stroke of at least one series actuator arranged upstream of the at least one main rotor actuator, wherein the at least one series actuator is coupled to a control lever that is connected to at least one parallel actuator, and wherein at least one first engine and at least one second engine are provided for powering the at least one main rotor;

wherein the flight control system is configured for controlling flight operation of the rotorcraft at least in an All Engines Operative (AEO) mode, in which the at least one first engine and the at least one second engine are powering the at least one main rotor, and in an asymmetric flight regime (AFR) mode, in which only the at least one first engine is powering the at least one main rotor; and wherein the flight control system comprises:

a control logic configured for pre-conditioning the at least one series actuator upon entering the AFR mode for enabling rotorcraft control upon occurrence of an in-flight shutdown IFSD) of the at least one first engine in the AFR mode, wherein pre-conditioning of the at least one series actuator comprises shifting a reduced nominal stroke range authorized for the series actuator stroke of the at least one series actuator in the AEO mode into a reduced shifted stroke range authorized for the series actuator stroke of the at least one series actuator in the AFR mode, in response to occurrence of an IFSD and wherein the control logic is configured, upon occurrence of an IFSD, to authorize the series actuator stroke in at least a portion of a region outside the reduced shifted stroke range that was unauthorized for the series actuator stroke in the AFR mode before occurrence of the IFSD.

16. The flight control system of claim 15, wherein the control logic is configured, upon occurrence of an IFSD, to increase the reduced shifted stroke range for the series actuator stroke to a maximally available stroke range to provide fully available control authority.

17. The flight control system of claim 15, wherein pre-conditioning of the at least one series actuator upon entering the AFR mode comprises shifting a neutral stroke position of the at least one series actuator to a maximally shifted neutral stroke position to provide fully available control authority upon occurrence of an IFSD, and adjusting the at least one parallel actuator to compensate for shifting of the neutral stroke position of the at least one series actuator.

18. A method of controlling flight operation of a rotorcraft, wherein the rotorcraft comprises: at least one main rotor with at least one main rotor actuator for adapting main rotor control dependent on a current flight condition of the rotorcraft, wherein main rotor actuator stroke of the at least one main rotor actuator is adjusted via series actuator stroke of at least one series actuator arranged upstream of the at least one main rotor actuator, and wherein the at least one series actuator is coupled to a control lever that is connected to at least one parallel actuator; at least one first engine and at least one second engine for powering the at least one main rotor; and a flight control system configured for controlling flight operation of the rotorcraft at least in an All Engines Operative (AEQ) mode, in which the at least one first engine and the at least one second engine are powering the at least one main rotor, and in an asymmetric flight regime (AFR) mode, in which only the at least one first engine is powering the at least one main rotor, the method comprising:

upon entering the AFR mode, pre-conditioning, by a control logic of the flight control system, the at least one series actuator for enabling rotorcraft control upon occurrence of an in-flight shutdown (IFSD) of the at least one first engine in the AFR mode, wherein pre-conditioning of the at least one series actuator comprises shifting a reduced nominal stroke range authorized for the series actuator stroke of the at least one series actuator in the AEO mode into a reduced shifted stroke range authorized for the series actuator stroke of the at least one series actuator in the AFR mode; and upon occurrence of an IFSD, authorizing, by the control logic, the series actuator stroke in at least a portion of a region outside the reduced shifted stroke range that was unauthorized for the series actuator stroke in the AFR mode before occurrence of the IFSD.

19. The method of claim 18, further comprising, upon occurrence of an IFSD, increasing the reduced shifted stroke range for the series actuator stroke to a maximally available stroke range to provide fully available control authority.

20. The method of claim 18, wherein pre-conditioning the at least one series actuator upon entering the AFR mode comprises shifting a neutral stroke position of the at least one series actuator to a maximally shifted neutral stroke position to provide fully available control authority upon occurrence of an IFSD, and adjusting the at least one parallel actuator to compensate for shifting of the neutral stroke position of the at least one series actuator.

* * * * *